United States Patent [19]
Baker

[11] 3,967,528
[45] July 6, 1976

[54] BOMB RACK SWAY BOLT ASSEMBLY

[75] Inventor: Curtis K. Baker, 25 Tally Ho Drive, Warminster, Pa. 18974

[73] Assignee: The United States of America as represented by the Secretary of the Navy, Washington, D.C.

[22] Filed: Apr. 5, 1974

[21] Appl. No.: 458,141

[52] U.S. Cl. ................................ 89/1.5 B; 85/62
[51] Int. Cl.² ...................... F41F 5/02; F16B 39/02
[58] Field of Search ............ 89/1.5 R, 1.5 B; 85/61, 85/62; 285/93; 403/41

[56] References Cited
UNITED STATES PATENTS

| | | | |
|---|---|---|---|
| 2,526,903 | 10/1950 | Ruppert | 89/1.5 B |
| 2,552,578 | 4/1951 | O'Mara et al. | 89/1.5 B |
| 2,745,303 | 5/1956 | Cornelius | 85/61 |
| 2,892,991 | 6/1959 | Beebee et al. | 285/93 |
| 2,995,033 | 8/1961 | Stifano | 85/62 |
| 3,008,376 | 11/1961 | Brunow et al. | 89/1.5 C |
| 3,799,108 | 3/1974 | Mosow | 85/62 |

FOREIGN PATENTS OR APPLICATIONS 577,186  5/1946  United Kingdom ................ 89/1.5 B Primary Examiner—Samuel W. Engle
Assistant Examiner—S. A. Cangialosi
Attorney, Agent, or Firm—R. S. Sciascia; Henry Hansen

[57] ABSTRACT

A single station bomb rack includes two cantilevered sway brace arms each provided with two oppositely placed sway bolts. The sway brace arms are shaped to accomodate a variety of store shapes and each of the sway brace arms acts in a spring-like fashion under loading. The sway bolts are each provided with internal springs which assure continuous pad-to-store contact. Each sway bolt is provided with a force indicating means which signals that sufficient force has been applied to the sway bolt thereby preventing unnecessary down-hook forces on the bomb rack hook.

3 Claims, 7 Drawing Figures

BOMB RACK SWAY BOLT ASSEMBLY

STATEMENT OF GOVERNMENT INTEREST

The invention described herein may be manufactured and used by or for the Government of the U.S.A. for governmental purposes without the payment of any royalties thereon or therefor.

BACKGROUND OF THE INVENTION

This invention relates to bomb rack sway brace assemblies and in particular to elastic sway brace assemblies including sway bolts providing continuous bolt-to-store contact under the influence of internal compression springs.

Spray brace assemblies are employed on bomb racks to restrain roll, yaw and pitch of the bomb about a retaining hook and to provide a measure of longitudinal restraint. Conventional sway brace assemblies normally employ solid sway bolts and massive sway brace arms which depend from a section of the bomb rack designed for load acceptance. Thus conventional systems employ a rigid construction in the sense that when the solid sway bolts are torqued down to engage a hard-cased store the elastic deflection of either the brace arm or the store is minute. (Hard-cased stores are defined herein as those stores whose case thickness and arc configuration present a virtually unyielding surface.)

Theoretically, hard cased stores restrained by rigid sway brace assemblies will follow all aircraft maneuvers without change in position. However, conventional sway brace assemblies of rigid construction have certain inherent disadvantages. For example, after firm metal seating of the solid bolt with the hard-cased store, further application of torque unnecessarily increases the down hook load without significant additional restraining force. Actual field experience has demonstrated that down hook forces several times the store weight are achieved when the bolts are excessively torqued. In severe cases of excessive torque application, the hook has failed, that is, fractured. Even in the absence of immediate hook failure, excessive torque application produces unwarranted stress on the hook and creates microscopic fissures which are readily attacked by salt spray. The resultant corrosion contributes to premature hook failures.

A further drawback of the conventional sway brace assembly results from the fact that the frictional restraining force in the longitudinal direction is not always proportional to the normal force at the bolt-to-shore interface. Slight but repeated translation of the store along the hook-to-store lug interface can quickly reduce the longitudinal restraint of the bolts to near zero.

An additional drawback of the conventional sway brace assembly is the imposition of an unwanted weight penalty when soft-cased stores must be carried since strong points or saddles must be provided. (Soft-cased stores are defined herein as those stores whose arc configuration and case thickness present a yielding surface.) Lastly the massive sway brace arms of the conventional sway brace systems have been known to fracture during severe aircraft maneuvers because such massive structures are unable to elastically deform under the forces generated by such maneuvers.

SUMMARY OF THE INVENTION

Accordingly, it is an object of this invention to facilitate reliable deployment of bombs and other stores and to allow a variety of store or bomb shapes to be carried by a bomb rack. It is a further object of this invention to enhance control of the store during aircraft maneuvers by providing continuous pad-to-store contact. It is a further object of this invention to reliably accommodate particular store weights while meeting the rigorous requirements for military applications. It is a further object of this invention to provide sway brace arms which elastically deform under severe aircraft maneuvers. These and other objects of the invention are achieved as follows.

An individual station bomb rack is provided with two cantilevered sway brace arms which have high tensile strength. Operating within elastic design limits, the sway brace arms yield under load and return to normal attitude after the load is removed, i.e., the sway brace arms act in a spring-like fashion. Each of the two sway brace arms is provided with two oppositely placed sway bolts which engage opposite sides of a bomb or other store suspended from a bomb rack hook. Each of the sway bolts includes an externally threaded sleeve, a rod movable within the sleeve and a spring internal to the sleeve and compressible between an internal sleeve shoulder and a shoulder provided on the rod. Both ends of the movable rod extend beyond the confines of the sleeve. The first or rack-end of the rod is provided with a force indicator means and the second or store-end of the rod is provided with a padded ball. The force indicator is a spring loaded device held in a ready-position by arc interference and frictional force between its lower end and the rack-end of the sleeve. As the threaded sleeve is turned down through a similarly threaded hole in the sway brace arm, the padded ball on the rod contacts the store surface and prevents further rod movement. However, the sleeve continues to travel toward the store. As the sleeve continues to travel through a free-motion distance (i.e. a maximum free travel distance or MFTD) between its store-end and the larger diameter padded ball, the arc interference and frictional force between the torque indicator and the sleeve is removed and the force indicator is released from its ready-position to its signal position to thereby indicate that sufficient force has been applied by the sway bolt.

Other objects, advantages and novel features of the invention will become apparent from the following detailed description of the invention when considered in conjunction with the accompanying drawings.

DESCRIPTION OF THE PREFERRED EMBODIMENTS

Figure 1:
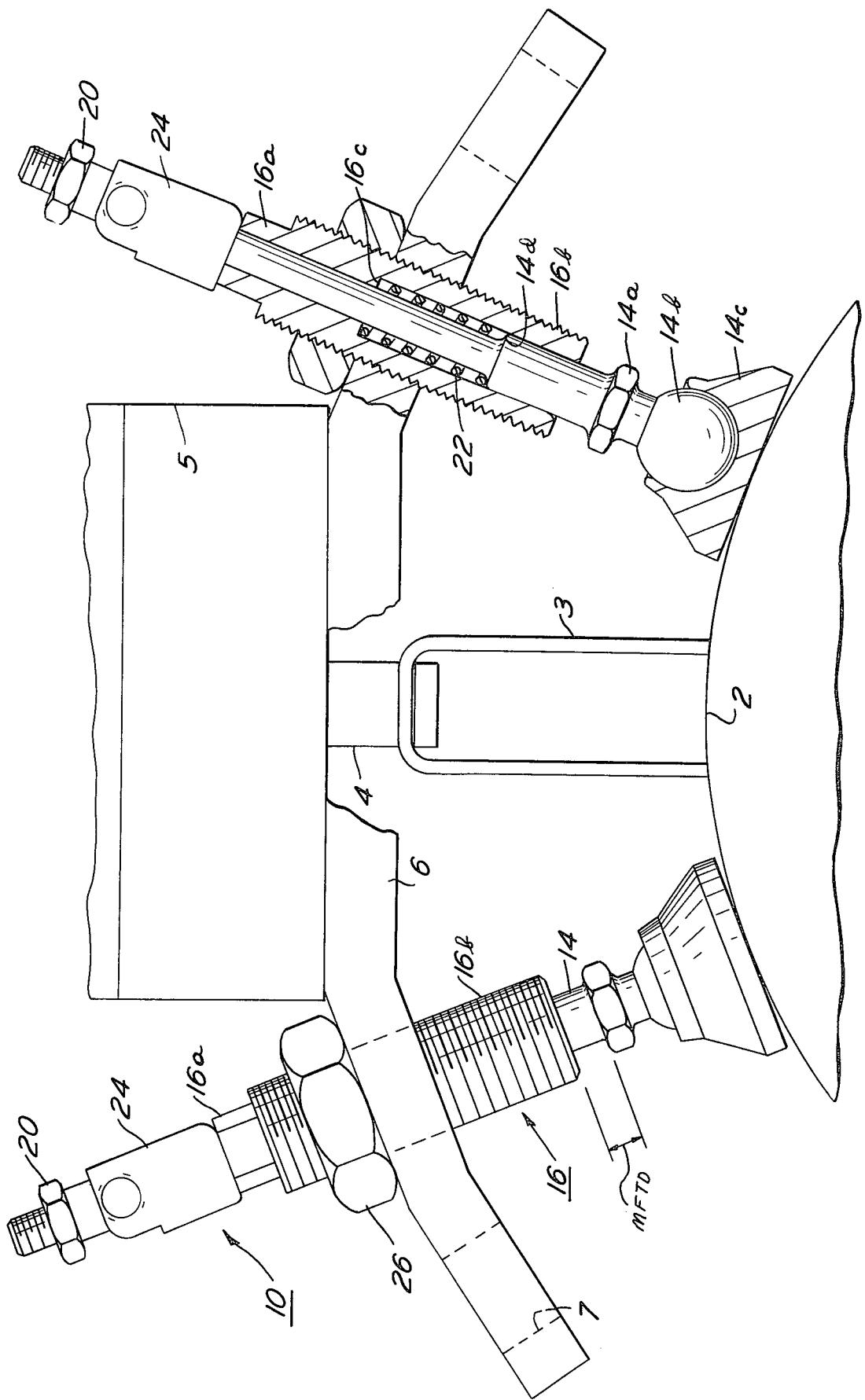
FIG. 1 shows a sway brace assembly according to the invention and partially in section.

Referring to FIG. 1, a bomb or other store 2 is shown suspended by an integral lug 3 from a bomb rack hook 4. Hook 4 supports store 2 in the vertical direction. Upon pilot command, hook 4 is rotation-released by a mechanism (not shown) contained within bomb rack fairing 5. As hook 4 rotates, lug 3 is released and store 2 is free to fall to the ground. An elastic sway brace arm 6 is connected to the underside or baseplate of fairing 5 by bolts or other suitable means not shown. (Part of sway brace arm 6 has been cut away to show hook 4). Sway brace arm 6 extends beyond both sides of fairing 5 in a bent cantilever fashion and is provided with 4 threaded holes 7. One hole on each side of sway brace arm 6 is provided with a sway bolt 10. The sway bolts 10 control the amount of allowable rotation or sway of store 2 about hook 4 during aircraft maneuvers. (FIG. 1 shows one sway brace arm 6 and its two associated sway bolts 10 for ease of illustration. In practice, two arms and associated bolts are used to control store sway. One arm is placed forward of hook 4 and the second arm is placed aft of hook 4.)

Sway brace arm 6 is a monolithic structure shaped into a flat center section and two cantilevered portions which project downwardly from each end of the flat center section. Each cantilevered portion is provided with a first section bent at an angle of approximately 21° with respect to the flat central section and a second section bent at an angle of approximately 34° with respect to the flat central section. The first and second sections of each cantilevered portion are each provided with threaded holes 7 which receive the threaded sleeve 16 of sway bolt 10. The 21° and 34° bends are formed about a nominal ⅜ inch radius at the bend points. While the cantilevered portions depend downwardly they also are swept back at an angle of approximately 27° from a vertical plane passing through sway brace arm 6. The downsweeps accommodate stores with various cross-sectional diameters while the sweepbacks accomodate a store whose diameter varies along its length.

Sway brace arm 6 is preferably made of 4340 MIL-S-5000 steel and is heat treated to have an enhanced ultimate tensile strength between 200K and 220K psi. Since the operating points of the sway brace arm 6 is designed to range between 140K and 160K psi, the sway brace arm is well within the elastic limit. Hence the cantilevered portions of the sway brace arm act in a spring-like manner, i.e., they yield under load and return to a normal position after load is removed. Furthermore since the operating point is at least 40K psi below the ultimate tensile strength, permanent deformation or fracture of the sway brace arm 6 is avoided.

Sway bolt 10 comprises a rod 14 movable within a surrounding sleeve 16. Sleeve 16 is provided with a tool land 16a and external threads 16b which mate with threads provided within hole 7 on sway brace arm 6. Sleeve 16 is provided with an internal annular shoulder at 16c by forming the sleeve such that a first portion of the sleeve has an inner diameter smaller than a second portion of the sleeve.

Rod 14 extends beyond both ends of sleeve 16. The first or store-end of rod 14 terminates in a hexagonal flange 14a and ball 14b about which a captive frusto-conical pad 14c is free to articulate. Pad 14c contacts store 2 when sleeve 16 is turned down with a wrench or other suitable tool applied to tool land 16a. The second or rack-end of rod 14 terminates in a length of thread so as to accomodate an adjustment nut 20. As will be explained more fully hereinbelow, nut 20 is turned down to adjust the maximum free travel distance (MFDT) between the store-end of sleeve 16 and flange 14a.

Rod 14 is not of uniform cross-section. Rather, a first section along its axis has a diameter slightly smaller than the inside diameter of the first portion of sleeve 16 and a second section along its axis has a diameter slightly smaller than the inside diameter of the second portion of sleeve 16. Thus rod 14 is free to move along the axis of sleeve 16 to the extent permitted by flange 14a and adjustment nut 20. The abuttment of the first and second sections of rod 14 forms an integral annular shoulder 14d. (For ease of reference, rod 14 is defined herein as a stepped diameter rod.)

Sway bolt 10 is also provided with a compressible spring 22 which reposes within the lower portion of the sleeve abutting rod shoulder 14d and sleeve shoulder 16c. As the sleeve is turned down through the sway brace arm 6 spring 22 is compressed between rod shoulder 14d and sleeve shoulder 16c. Sway bolt 10 is further provided with a tab assembly 24 placed between adjustment nut 20 and the rack-end of sleeve 16. As will be explained more fully hereinbelow, tab assembly 24 functions to signal to the person turning sleeve 16 that a predetermined amount of force has been applied to store 2. After tab assembly 24 has signaled that sufficient force has been applied to store 2, a stop nut 26 is turned down to engage the sway brace arm 6. Stop nut 26 serves to prevent sleeve 16 from backing out of the sway brace arm 6 under the influence of aircraft vibration.

Figure 2A:
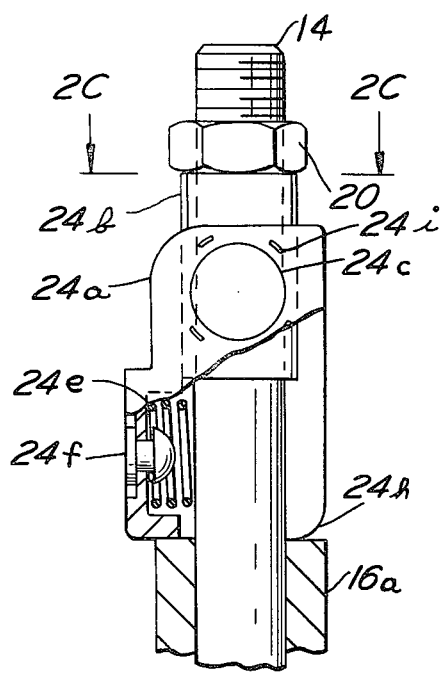
FIGS. 2a, 2b, and 2c show a side, front and top view respectively of a tab assembly in the ready-position according to the invention and partially in section.
Figure 2B:
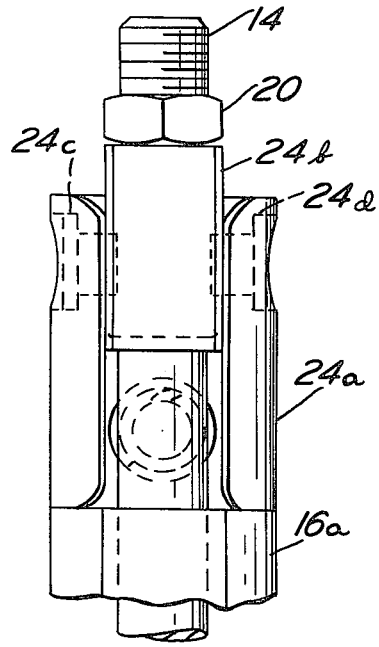
Figure 2C:
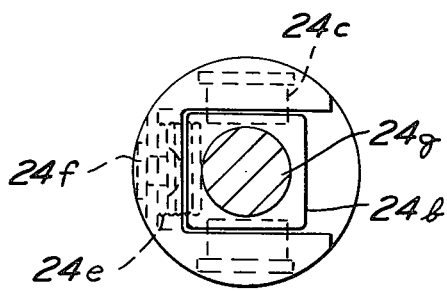

Referring to FIGS. 2a and 2b and 2c wherein parts already illustrated in FIG. 1 are numbered identically, tab assembly 24 includes a release tab 24a and tab block 24b. Two tab pivots 24c and 24d permit rotation of release tab 24a with respect to tab block 24b. Each of the tab pivots 24c and 24d are retained within the tab assembly by staking the release tab at points such as 24i, so that metal displaces toward the pivot cavity. A normally compressed tab release spring 24e has a free end which normally bears against rod 14 and a fixed end held in place by tab rivet 24f.

Tab block 24b is formed as a parallelepiped having an axially centered cylindrical hole 24g throughout its entire length which accomodates the rack end of rod 14. Release tab 24a has a generally circular cross-section in a plane perpendicular to its axis. However, as can be seen from FIGS. 2a, 2b and 2c portions of the release tab sidewalls have been removed from the rivet side of the release tab and the side opposite the rivet side. The removed portions are located in planes parallel to the longitudinal axis of release tab 24b. On the rivet side, only the upper portion of the sidewall is removed and the lower portion of the sidewall is retained so as to provide a mounting for rivet 24f. On the side opposite the rivet, the entire sidewall is removed. As can be seen from FIG. 3, these portions of the release tab sidewalls must be removed to permit rotation of the release tab 24a with respect to the tab block 24b; rotation of the release tab 24a with respect to the tab block 24b will be explained more fully hereinbelow. The store-end of release tab 24a is provided with rounded edges 24h which facilitate movement of the release tab 24a over the rack end of sleeve 16.

Operation of tab assembly 24 will now be explained. With the entire sway bolt assembly 10 removed from the sway brace arm 6, finger pressure is applied to tab assembly 24 so as to compress tab release spring 24e and to bring the release tab 24a into general concentric alignment with rod 14. While finger pressure is maintained, adjustment nut 20 is turned so as to draw rod 14 through nut 20 to thereby reduce the distance between the store-end of sleeve 16 and flange 14a to a predetermined value defined herein as the MFDT. (for hard-cased stores the MFDT is between 15 and 20 mils, while for the soft-cased stores the MFDT is between 20 and 100 mils. After the desired MFDT has been reached, finger pressure is removed but release tab 24a remains in the ready position (shown in FIG. 1) due to arc interference and friction forces between it and the rack end of sleeve 16. Release tab 24a remains in the ready position until movement of rod 14 as follows.

Figure 3:
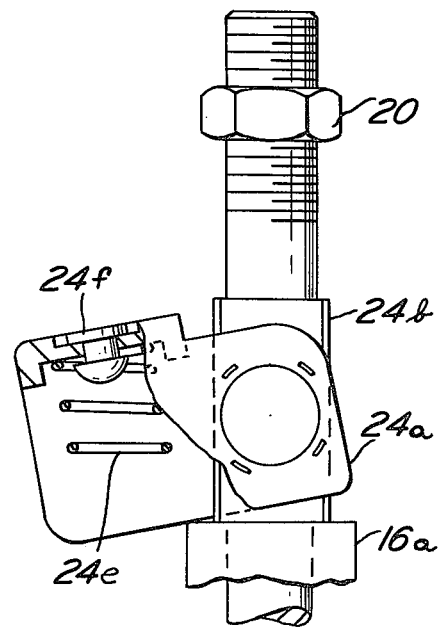
FIG. 3 shows the tab assembly of FIGS. 2a, 2b and 2c partially in section and in the actuated position.

After the tab assembly 24 has been placed in the ready position the sway bolt assembly 10 is threaded through sway brace arm 6 until pad 14c engages store 2. With pad 14c in contact with store 2 further rotation of sleeve 16 compresses spring 24 between sleeve shoulder 16c and rod shoulder 14d and moves sleeve 16 toward store 2 while rod 14 is held stationary by store 2. This relative movement of the sleeve 16 with respect to the stationary rod 14 allows sleeve 16 to move through a portion of the MFDT thereby freeing release tab 24a which thereupon sharply and suddenly rotates under the impetus of tab spring 24e about pivots 24c and 24d and away from the axis of rod 14. FIG. 3 shows the position of the release tab 24a with respect to the tab block 24b after the above sequence of events.

The release of tab assembly 24 in the foregoing manner indicates to the person torquing down sleeve 16 that sufficient force has been applied to store 2 and that the sleeve is not to be turned further.

The sway bolts 10 and sway brace arms 6 cooperate with each other in two principal modes of operation, namely, the hard-cased mode and the soft-cased mode. In the hard-cased mode spring 22 is substantially fully compressed and the MFDT or free motion spacing between flange 14a and sleeve 16 is arranged to be between 15 and 20 mils. In the soft-cased mode spring 22 is never fully compressed and the nominal set is arranged to be between 20 and 100 mils maximum. This free-motion spacing allows a controlled sway of the store about the hook prior to deformation of the sprung sway brace arm 6 while maintaining a continuous pad to store contact. It is of course clear from the above that the material difference between the hard-cased mode and the soft-cased mode of operation resides in the amount of free-motion provided to the rod before flange 14a butts against the store end of sleeve 16 and before the sprung sway brace arm begins to flex.

The advantages of constructing a sway bolt in accordance with the principals of this invention can be better understood by considering what happens when an aircraft undertakes a maneuver. Aircraft maneuver load energy, especially a maneuver about the roll axis, is stored in the controlling elastic members comprising the sprung sway brace arms 6 and the spring loaded sway brace bolts 10. This stored energy returns the elastic members and the store to their normal attitude upon completion of the roll maneuver. For no damage, rigid sway brace systems of the prior art demand greater depth of elastic deformation in soft-cased stores since the sway brace arms of such systems yield very little. If the condition can not be met, permanent deformation of the store case results.

An additional advantage provided by sway bolts construed according to the present invention is that continuous sway pad contact with the store is achieved. Continuous sway pad contact with the store surface reduces shock load damage. Repetitive suddenly applied loads have greater damage potential than gradually applied loads of equal magnitudes. In conventional rigid systems, yield, with permanent set, of a store surface opens a space between the sway bolt pad and the store surface and permits momentum buildup. That is, with a rigid sway brace and sway bolt assembly, only one side of such rigid assembly would move, i.e. contact the store surface, during a severe roll maneuver. After the maneuver is completed, the store surface would be slammed into the solid sway brace arm and bolt which did not move during the maneuver. If the above circumstance is recurrent, shock hammer further opens the distance and further damage results.

Two further advantages are provided by sway bolts constructed according to the present invention. First, by providing continuous pad-to-store contact, padwear under translation of the store is compensated by advancement of rod 14 by spring 22 as wear proceeds. Secondly, when the hook 4 is released, the compressed spring 22 within each of the four sway bolts 10 act to push the store away from the hook and thus are an additional factor in bringing about reliable release of the bomb.

These and other advantages, as should be apparent from the description herein, are particularly relevant to meeting the rigorous reliability requirements for use in high performance military aircraft. For example, the present invention may reliably accomodate store weights of approximately 100 pounds while meeting the operational requirements of Military Standard A8591.

Figure 4:
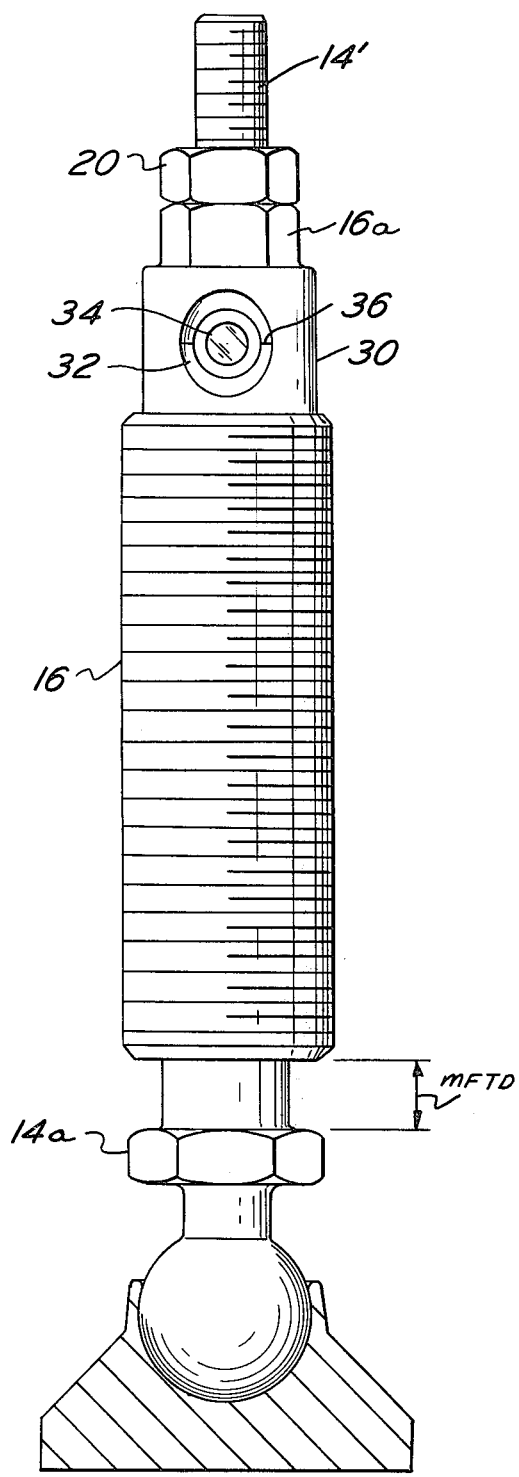
FIGS. 4 and 4a show a modification of a sway bolt according to the invention.
Figure 4A:
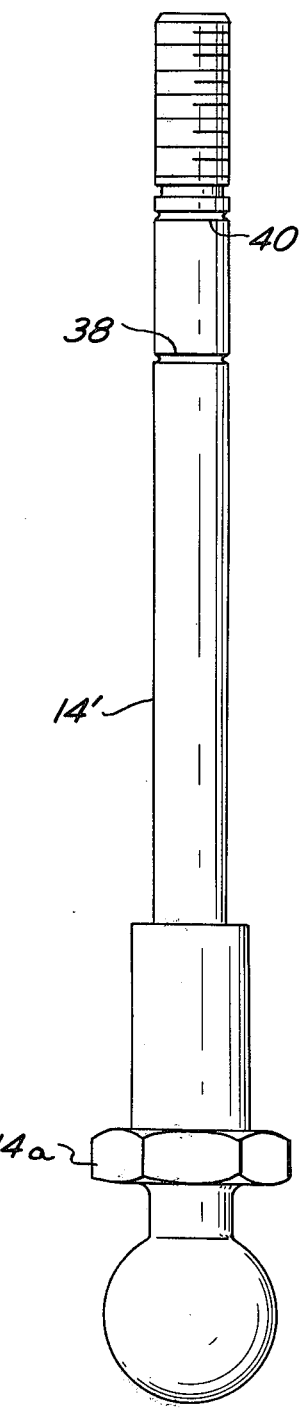

FIGS. 4a and 4b, wherein like numerals indicate parts previously disclosed, show a second force indicator means which may be used in lieu of tab assembly 24. In FIG. 4a, sleeve 16 has been formed with a smooth surfaced cylindrical portion 30 located between the terminal point of threads 16b and tool land 16a. Portion 30 is provided with a recessed viewing port 32. Port 32 is covered by a transparent plastic lens 34 or other suitable transparent material. Port 32 is also provided with markings 36 disposed perpendicular to the axis of rod 14'. FIG. 4b shows a sway bolt rod 14' which is similar to the sway bolt rod 14 shown in FIGS. 1, 2 and 3 except that the rack end of rod 14' is provided with 2 grooves 38 and 40 placed along the axis of rod 14' and within planes perpendicular to that axis. The grooves are each filled with red or black ink so as to be easily visible.

In the embodiment shown in FIGS. 4a and 4b the placement of marker grooves 38 and 40 is accomplished in the following fashion. The distance between the store-end of sleeve 16 and the midpoint of port 32 was selected to be approximately 2.750 inches while the distance between flange 14a and the center of groove 38 was selected to be 2.770 inches in one form of the invention. With such preselection alignment of groove 38 and markers 36 leaves approximately 20 mils free travel distance between the sleeve and flange 14a with proper force application. Groove 40 is so placed that the distance from the center of groove 38 to the center of groove 40 plus ½ the width of groove 40 exactly equals the designate distance between markers 36 and the top of the tool land 16a.

Operation of the torque indicator means shown in FIGS. 4a and 4b is as follows. As sleeve 16 is turned down through the sway brace arm 6 pad contact with the store surface is achieved. After pad 14c contacts the store surface sleeve 16 continues to move toward the store surface but rod 14' is stationary and as sleeve 16 advances groove 38 eventually aligns itself with markers 36. The alignment of groove 38 with markers 36 indicates that sufficient force has been applied by the sway bolt and that further turning is unnecessary. However, should further force be applied, groove 40 becomes visible above the top of tool land 16a. The appearance of groove 40 signals that excess force has been applied by the sway bolt.

Obviously, many modifications and variations of the present invention are possible in the light of the above teachings. It is therefore to be understood that within the scope of the appended claims the invention may be practiced otherwise than as specifically described.

I claim:

1. A sway bolt assembly comprising:
   a sleeve having an internal shoulder;
   a stepped diameter rod having a shoulder and slidably extending through the sleeve;
   a spring axially concentric with said rod, radially interposed between the sleeve and the rod, and abutting said sleeve shoulder and said rod shoulder;
   an adjustment member removably secured to a first end of said rod;
   a contact member attached to a second end of said rod; and
   an indicator means, mounted on the rod between the adjustment member and the sleeve, for indicating that a predetermined compressive force has been applied to the sleeve spring, including a tab block slidably affixed to the rod, a release tab pivotally connected to the tab block, and a tab spring having one end affixed to the release tab.

2. A sway bolt assembly, secured by a sway brace arm, for engaging the surface of a store suspended from a bomb rack hook comprising:
   a sleeve having an internal shoulder and movably secured by said sway brace arm, said sleeve having a rack-end and a store-end;
   a stepped diameter rod having a shoulder and slidably extending through said sleeve, said rod having a rack-end and a store-end;
   a sleeve spring axially concentric with said rod and radially interposed between said rod and sleeve, said sleeve having a first end abutting said rod shoulder and a second end abutting said sleeve shoulder;
   indicator means, abutting the rack-end of said sleeve, for indicating that a predetermined compressive force has been applied to said sleeve spring, including a tab block slidably affixed to the rack-end of said rod, a release tab pivotally connected to said tab block, and a tab spring having one end affixed to a sidewall of said release tab; and
   an adjustment member movably secured to the rack-end of said rod and abutting said indicator means.

3. A sway bolt assembly for securing a store suspended in a rack, comprising:
   sleeve means formed to be supported by the rack;
   rod means slidably extending through said sleeve means along an axis approximately normal to the surface of the store and having one end formed to abut the surface of the store;
   first spring means interposed between said sleeve and said rod means for urging said rod means outward from said sleeve means toward the store;
   first stop means secured adjacent to the other end of said rod means for limiting the outward movement of said rod means relative to said sleeve means; and
   indicator means affixed to said rod means for indicating the compression force of said first spring means at a predetermined position of said rod means relative to said sleeve means, including a release tab pivotally connected to said other end of said rod means having distal planar surfaces formed to abut corresponding surfaces of said first stop means and said sleeve means, and second spring means interposed between said release tab and said rod means for urging the free end of said release means out of abutment when the compression force of said first spring means is above a predetermined level.

* * * * *